(12) United States Patent
Engel et al.

(10) Patent No.: US 7,730,413 B1
(45) Date of Patent: Jun. 1, 2010

(54) DISPLAY METHOD FOR MULTIPLE LAYERED SCREENS

(75) Inventors: Gabriel Daemon Engel, Hamilton (NZ); Pita Witehira, Hamilton (NZ)

(73) Assignee: PureDepth Limited, Auckland (NZ)

( * ) Notice: Subject to any disclaimer, the term of this patent is extended or adjusted under 35 U.S.C. 154(b) by 635 days.

(21) Appl. No.: 10/048,966

(22) PCT Filed: Aug. 18, 2000

(86) PCT No.: PCT/NZ00/00161

§ 371 (c)(1),
(2), (4) Date: Feb. 6, 2002

(87) PCT Pub. No.: WO01/15127

PCT Pub. Date: Mar. 1, 2001

(30) Foreign Application Priority Data

Aug. 19, 1999 (NZ) .................................. 337334

(51) Int. Cl.
G06F 3/00 (2006.01)
G09F 5/00 (2006.01)
G02F 1/133 (2006.01)

(52) U.S. Cl. ................. 715/764; 715/765; 715/766; 715/767; 345/629; 345/619; 345/630; 345/634; 345/637; 349/73

(58) Field of Classification Search ......... 715/764–767, 715/778, 790, 768, 762; 345/629, 634, 636, 345/619, 630, 637; 349/73
See application file for complete search history.

(56) References Cited

U.S. PATENT DOCUMENTS 3,863,246 A   1/1975 Trcka et al.
4,239,349 A   12/1980 Scheffer
4,294,516 A   10/1981 Brooks
4,333,715 A   6/1982 Brooks
4,371,870 A   2/1983 Biferno
4,423,929 A   1/1984 Gomi
4,443,062 A   4/1984 Togashi et al.
4,472,737 A   9/1984 Iwasaki
4,523,848 A   6/1985 Gorman et al.
4,556,286 A   12/1985 Uchida et al.
4,562,433 A   12/1985 Biferno
4,568,928 A   2/1986 Biferno
4,648,691 A   3/1987 Oguchi et al.

(Continued)

FOREIGN PATENT DOCUMENTS

AU              82482/98            9/1998

(Continued)

OTHER PUBLICATIONS

"Clearboard 1991-1994," http://web.media.mit.edu/~ishii/CB.html.
"Teamworkstation 1989-1994," http://web.media.mit.edu/~ishii/TWS.html.
"Textarc: An Alternate Way to View a Text," http://textarc.org.
"Textarc: NYSCA Grant and Public Installation," http//textarc.org.
"Textarc: The Print and The Artist," http://textarc.org.
Courter et al., Microsoft Office 2000 Professional Edition, 1999, Sybex Inc., pp. xxxi, 543, 685.

(Continued)

*Primary Examiner*—Tadeese Hailu

(57) ABSTRACT

A method of displaying data or images on a multi-level screen display, assigns screen designation codes to respective software components, to determine the physical screen on which the corresponding images or software components are displayed. The screens may include layered liquid crystal displays. The method allows a user to see overlaying objects at the same time, e.g., toolbars or menus can be displayed on a front screen, and a drawing image can be displayed on a background screen.

63 Claims, 3 Drawing Sheets

U.S. PATENT DOCUMENTS

| | | | |
|---|---|---|---|
| 4,649,425 A | 3/1987 | Pund | |
| 4,712,869 A | 12/1987 | Claxton | |
| 4,768,300 A | 9/1988 | Rutili | |
| 4,890,257 A * | 12/1989 | Anthias et al. | 715/807 |
| 4,927,240 A | 5/1990 | Stolov et al. | |
| 4,947,257 A * | 8/1990 | Fernandez et al. | 348/585 |
| 5,049,870 A | 9/1991 | Fitzgerald et al. | |
| 5,050,965 A | 9/1991 | Conner et al. | |
| 5,091,720 A * | 2/1992 | Wood | 715/781 |
| 5,112,121 A | 5/1992 | Chang et al. | |
| 5,113,272 A | 5/1992 | Reamey | |
| 5,124,803 A | 6/1992 | Troxel | |
| 5,198,936 A | 3/1993 | Stringfellow | |
| 5,255,028 A | 10/1993 | Biles | |
| 5,255,356 A | 10/1993 | Michelman et al. | |
| 5,283,560 A * | 2/1994 | Bartlett | 715/729 |
| 5,289,297 A | 2/1994 | Bollman et al. | |
| 5,317,686 A | 5/1994 | Salas et al. | |
| 5,333,255 A | 7/1994 | Damouth | |
| 5,361,165 A | 11/1994 | Stringfellow et al. | |
| 5,367,801 A | 11/1994 | Ahn | |
| 5,396,429 A | 3/1995 | Hanchett | |
| 5,416,890 A | 5/1995 | Beretta | |
| 5,416,895 A | 5/1995 | Anderson et al. | |
| 5,418,898 A | 5/1995 | Zand et al. | |
| 5,463,724 A | 10/1995 | Anderson et al. | |
| 5,465,101 A | 11/1995 | Akiba et al. | |
| 5,473,344 A | 12/1995 | Bacon et al. | |
| 5,475,812 A * | 12/1995 | Corona et al. | 715/807 |
| 5,479,185 A | 12/1995 | Biverot | |
| 5,502,805 A | 3/1996 | Anderson et al. | |
| 5,585,821 A | 12/1996 | Ishikura et al. | |
| 5,590,259 A | 12/1996 | Anderson et al. | |
| 5,600,462 A | 2/1997 | Suzuki et al. | |
| 5,600,765 A | 2/1997 | Ando et al. | |
| 5,604,854 A | 2/1997 | Glassey | |
| 5,623,591 A | 4/1997 | Cseri | |
| 5,638,501 A * | 6/1997 | Gough et al. | 345/639 |
| 5,651,107 A * | 7/1997 | Frank et al. | 715/768 |
| 5,663,746 A | 9/1997 | Pellenberg et al. | |
| 5,664,127 A | 9/1997 | Anderson et al. | |
| 5,675,755 A | 10/1997 | Trueblood | |
| 5,694,150 A | 12/1997 | Sigona et al. | |
| 5,694,532 A | 12/1997 | Carey et al. | |
| 5,695,346 A | 12/1997 | Sekiguchi et al. | |
| 5,721,847 A | 2/1998 | Johnson | |
| 5,729,219 A | 3/1998 | Armstrong et al. | |
| 5,757,522 A | 5/1998 | Kulick et al. | |
| 5,764,317 A * | 6/1998 | Sadovnik et al. | 349/5 |
| 5,772,446 A | 6/1998 | Rosen | |
| 5,796,455 A | 8/1998 | Mizobata et al. | |
| 5,805,163 A * | 9/1998 | Bagnas | 715/768 |
| 5,805,171 A | 9/1998 | St. Clair et al. | |
| 5,813,742 A | 9/1998 | Gold et al. | |
| 5,825,436 A | 10/1998 | Knight | |
| 5,828,420 A * | 10/1998 | Marshall et al. | 725/47 |
| 5,831,615 A * | 11/1998 | Drews et al. | 715/768 |
| 5,835,088 A | 11/1998 | Jaaskelainen, Jr. | |
| 5,880,742 A | 3/1999 | Rao et al. | |
| 5,883,623 A | 3/1999 | Cseri | |
| 5,883,627 A * | 3/1999 | Pleyer | 345/629 |
| 5,883,635 A | 3/1999 | Rao et al. | |
| 5,890,174 A | 3/1999 | Khanna et al. | |
| 5,923,307 A | 7/1999 | Hogle, IV | |
| 5,924,870 A | 7/1999 | Brosh et al. | |
| 5,963,197 A | 10/1999 | Bacon et al. | |
| 5,999,191 A * | 12/1999 | Frank et al. | 345/634 |
| 6,005,654 A | 12/1999 | Kipfer et al. | |
| 6,016,385 A | 1/2000 | Yee et al. | |
| 6,018,379 A | 1/2000 | Mizobata et al. | |
| 6,031,530 A * | 2/2000 | Trueblood | 715/791 |
| 6,037,937 A * | 3/2000 | Beaton et al. | 715/764 |
| 6,057,814 A | 5/2000 | Kalt | |
| 6,061,110 A | 5/2000 | Hisatake et al. | |
| 6,072,489 A * | 6/2000 | Gough et al. | 715/803 |
| 6,075,531 A | 6/2000 | DeStefano | |
| 6,085,202 A | 7/2000 | Rao et al. | |
| 6,097,361 A * | 8/2000 | Rohner | 345/87 |
| 6,100,862 A | 8/2000 | Sullivan | |
| 6,111,614 A * | 8/2000 | Mugura et al. | 348/569 |
| 6,118,427 A * | 9/2000 | Buxton et al. | 345/629 |
| 6,163,318 A | 12/2000 | Fukuda et al. | |
| 6,181,349 B1 | 1/2001 | Bardon et al. | |
| 6,201,581 B1 * | 3/2001 | Moriwake et al. | 348/587 |
| 6,204,902 B1 | 3/2001 | Kim et al. | |
| 6,215,490 B1 | 4/2001 | Kaply | |
| 6,215,898 B1 | 4/2001 | Woodfill et al. | |
| 6,239,852 B1 | 5/2001 | Oono et al. | |
| 6,246,407 B1 | 6/2001 | Wilks et al. | |
| 6,269,173 B1 | 7/2001 | Hsien | |
| 6,282,551 B1 | 8/2001 | Anderson et al. | |
| 6,300,990 B1 | 10/2001 | Yamaguchi et al. | |
| 6,317,128 B1 * | 11/2001 | Harrison et al. | 345/629 |
| 6,327,592 B1 | 12/2001 | Yoshikawa | |
| 6,341,439 B1 | 1/2002 | Lennerstad | |
| 6,351,298 B1 | 2/2002 | Mitsui et al. | |
| 6,356,281 B1 | 3/2002 | Isenman | |
| 6,369,830 B1 * | 4/2002 | Brunner et al. | 345/629 |
| 6,377,229 B1 | 4/2002 | Sullivan | |
| 6,418,426 B1 | 7/2002 | Schlesinger | |
| 6,438,515 B1 | 8/2002 | Crawford et al. | |
| 6,443,579 B1 | 9/2002 | Myers | |
| 6,466,185 B2 * | 10/2002 | Sullivan et al. | 345/6 |
| 6,468,157 B1 | 10/2002 | Hinami et al. | |
| 6,496,832 B2 | 12/2002 | Chi et al. | |
| 6,505,209 B1 | 1/2003 | Gould et al. | |
| 6,525,699 B1 | 2/2003 | Suyama et al. | |
| 6,538,660 B1 | 3/2003 | Celi, Jr. et al. | |
| 6,587,094 B2 | 7/2003 | Anderson | |
| 6,587,118 B1 | 7/2003 | Yoneda | |
| 6,593,904 B1 | 7/2003 | Marz et al. | |
| 6,609,799 B1 | 8/2003 | Myers | |
| 6,610,102 B1 | 8/2003 | Aldred et al. | |
| 6,661,425 B1 | 12/2003 | Hiroaki | |
| 6,693,692 B1 | 2/2004 | Kaneko et al. | |
| 6,721,713 B1 | 4/2004 | Guheen et al. | |
| 6,725,422 B1 | 4/2004 | Bauchot et al. | |
| 6,760,003 B1 | 7/2004 | Sase | |
| 6,771,327 B2 | 8/2004 | Sekiguchi | |
| 6,845,578 B1 | 1/2005 | Lucas | |
| 6,859,907 B1 | 2/2005 | McGarry | |
| 7,168,048 B1 * | 1/2007 | Goossen et al. | 715/797 |
| 2001/0026625 A1 | 10/2001 | Azima et al. | |
| 2002/0067373 A1 | 6/2002 | Roe et al. | |
| 2002/0091728 A1 | 7/2002 | Kjaer et al. | |
| 2002/0093516 A1 | 7/2002 | Brunner et al. | |
| 2002/0163728 A1 | 11/2002 | Myers | |
| 2002/0163729 A1 | 11/2002 | Myers | |
| 2003/0069074 A1 | 4/2003 | Jackson | |
| 2003/0132895 A1 | 7/2003 | Berstis | |
| 2003/0184665 A1 | 10/2003 | Berstis | |
| 2004/0239582 A1 | 12/2004 | Seymour | |

FOREIGN PATENT DOCUMENTS

| | | |
|---|---|---|
| AU | 24806/00 | 7/2000 |
| AU | 24538/00 | 8/2000 |
| AU | 68219/01 | 12/2001 |
| BE | 1011678 | 12/1999 |
| CA | 2009960 | 9/1990 |
| CA | 2075807 | 8/1991 |
| CA | 2139696 | 7/1995 |
| CA | 2320694 | 8/1999 |
| CN | 1293805 | 5/2001 |

| | | |
|---|---|---|
| CN | 1294695 | 5/2001 |
| DE | 2730785 | 1/1979 |
| DE | 29912074 | 11/1999 |
| DE | 19920789 | 5/2000 |
| EP | 0389123 | 9/1990 |
| EP | 0 454 423 A1 * | 10/1991 |
| EP | 454423 | 10/1991 |
| EP | 662669 | 1/1994 |
| EP | 595387 | 5/1994 |
| EP | 595387 A * | 5/1994 |
| EP | 0703563 | 3/1996 |
| EP | 0802684 | 10/1997 |
| EP | 0935191 | 8/1999 |
| EP | 1057070 | 8/1999 |
| EP | 0999088 | 5/2000 |
| EP | 1151430 | 8/2000 |
| EP | 1177527 | 11/2000 |
| EP | 1093008 | 4/2001 |
| EP | 1287401 | 3/2003 |
| GB | 2145897 | 4/1985 |
| GB | 2245092 | 12/1991 |
| GB | 2312584 | 10/1997 |
| GB | 2347003 | 8/2000 |
| GB | 2372618 | 8/2002 |
| IL | 93472 | 11/1994 |
| JP | 62-235929 | 10/1987 |
| JP | 63-65795 | 3/1988 |
| JP | 63-100898 | 5/1988 |
| JP | 1-229591 | 9/1989 |
| JP | 2-90127 | 3/1990 |
| JP | 2-146087 | 6/1990 |
| JP | 3021902 | 1/1991 |
| JP | 3174580 | 7/1991 |
| JP | 3-226095 | 10/1991 |
| JP | 3226095 | 10/1991 |
| JP | 4191755 | 7/1992 |
| JP | 6-274305 | 9/1994 |
| JP | 6274305 | 9/1994 |
| JP | 6-314181 | 11/1994 |
| JP | 63-39299 | 12/1994 |
| JP | 7-44349 | 2/1995 |
| JP | 8-30243 | 2/1996 |
| JP | 8-036375 | 2/1996 |
| JP | 8030388 | 2/1996 |
| JP | 8-83160 | 3/1996 |
| JP | 8095741 | 4/1996 |
| JP | 09-033858 | 2/1997 |
| JP | 9-230825 | 9/1997 |
| JP | 9-282357 | 10/1997 |
| JP | 9308769 | 12/1997 |
| JP | 10003355 | 1/1998 |
| JP | 10039782 | 2/1998 |
| JP | 10039821 | 2/1998 |
| JP | 10105829 | 4/1998 |
| JP | 10228347 | 8/1998 |
| JP | 10-260784 | 9/1998 |
| JP | 10-334275 | 12/1998 |
| JP | 11205822 | 7/1999 |
| JP | 2000-142173 | 5/2000 |
| JP | 2000-347645 | 12/2000 |
| JP | 2000-99237 | 10/2001 |
| JP | 2001-215332 | 4/2002 |
| JP | 2001-56675 | 9/2002 |
| JP | 2002-350772 | 12/2002 |
| JP | 2002-099223 | 10/2003 |
| NL | 1005868 | 10/1997 |
| NO | 20005178 | 4/2001 |
| PL | 343229 | 4/2001 |
| WO | 91/12554 | 8/1991 |
| WO | 96/27992 | 9/1996 |
| WO | 98/47106 | 10/1998 |
| WO | 99/42889 | 8/1999 |
| WO | 00/036578 | 6/2000 |
| WO | 00/048167 | 8/2000 |
| WO | 00/68887 | 11/2000 |
| WO | 01/01290 | 1/2001 |
| WO | 01/15127 | 3/2001 |
| WO | 01/15128 | 3/2001 |
| WO | 01/95019 | 12/2001 |
| WO | 02/35277 | 5/2002 |
| WO | 02/084637 | 10/2002 |
| WO | 02/091033 | 11/2002 |
| WO | 03/003109 | 1/2003 |
| ZA | 9703025 | 11/1997 |

OTHER PUBLICATIONS

Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
Office Action U.S. Appl. No. 10/048,638, filed Jun. 6, 2007.
Office Action U.S. Appl. No. 10/048,638, filed Jun. 26, 2006.
Office Action U.S. Appl. No. 10/048,638, filed Sep. 30, 2004.
Office Action U.S. Appl. No. 10/048,638, filed Oct. 17, 2005.
Office Action U.S. Appl. No. 10/048,638, filed Nov. 27, 2007.
Office Action U.S. Appl. No. 10/049,271, filed Feb. 5, 2005.
Office Action U.S. Appl. No. 10/049,271, filed Feb. 8, 2006.
Office Action U.S. Appl. No. 10/049,271, filed Mar. 2, 2007.
Office Action U.S. Appl. No. 10/049,271, filed May 18, 2005.
Office Action U.S. Appl. No. 10/049,271, filed Aug. 23, 2006.
Office Action U.S. Appl. No. 10/049,271, filed Nov. 17, 2004.
Office Action U.S. Appl. No. 10/049,272, filed Jan. 23, 2006.
Office Action U.S. Appl. No. 10/049,272, filed Mar. 25, 2008.
Office Action U.S. Appl. No. 10/049,272, filed May 21, 2007.
Office Action U.S. Appl. No. 10/049,272, filed Jul. 13, 2005.
Office Action U.S. Appl. No. 10/049,272, filed Jul. 26, 2004.
Office Action U.S. Appl. No. 10/049,272, filed Aug. 28, 2006.
Office Action U.S. Appl. No. 10/049,272, filed Oct. 12, 2007.
Office Action U.S. Appl. No. 10/049,272, filed Nov. 29, 2004.
Office Action U.S. Appl. No. 10/049,272, filed Dec. 14, 2007.
Office Action U.S. Appl. No. 10/049,272, filed Dec. 31, 2003.
Office Action U.S. Appl. No. 10/476,590, filed Mar. 3, 2006.
Office Action U.S. Appl. No. 10/476,590, filed Apr. 19, 2007.
Office Action U.S. Appl. No. 10/476,590, filed Oct. 6, 2006.
Office Action U.S. Appl. No. 10/476,590, filed Oct. 16, 2007.
Office Action U.S. Appl. No. 10/489,101, filed Mar. 29, 2006.
Office Action U.S. Appl. No. 10/489,101, filed Jul. 16, 2007.
Office Action U.S. Appl. No. 10/489,101, filed Jul. 28, 2005.
Office Action U.S. Appl. No. 10/489,101, filed Nov. 22, 2005.
Office Action U.S. Appl. No. 10/048,638; Mail Date Jun. 6, 2008.
Office Action U.S. Appl. No. 10/049,271; Mail Date Feb. 5, 2008.
Office Action U.S. Appl. No. 10/049,271; Mail Date Aug. 5, 2008.
Office Action U.S. Appl. No. 10/049,272; Mail Date Aug. 13, 2008.
Office Action U.S. Appl. No. 10/049,272; Mail Date Dec. 24, 2008.
Office Action U.S. Appl. No. 10/476,590; Mail Date Feb. 28, 2008.
Office Action U.S. Appl. No. 10/476,590; Mail Date Jun. 19, 2008.
Office Action U.S. Appl. No. 10/476,590; Mail Date Oct. 29, 2008.
Office Action U.S. Appl. No. 10/528,334; Mail Date Feb. 24, 2009.
Office Action U.S. Appl. No. 10/528,334; Mail Date Aug. 5, 2008.
Final OA Dated Dec. 24, 2008; U.S. Appl. No. 10/049,272; Pure-P002.
Final OA Dated Feb. 24, 2009; U.S. Appl. No. 10/528,334;Pure-P013.
Final OA Dated Mar. 23, 2009; U.S. Appl. No. 10/476,590; Pure-P024.
Non-Final Office Action Dated Aug. 14, 2009; U.S. Appl. No. 10/049,272.
Non-Final Office Action Dated Sep. 4, 2009; U.S. Appl. No. 10/476,590.

Non-Final Office Action Dated Sep. 1, 2009; U.S. Appl. No. 10/528,334.
Non-Final Office Action Dated Sep. 9, 2009; U.S. Appl. No. 10/557,157.
Non-Final Office Action Dated Aug. 12, 2009; U.S. Appl. No. 12/107,589.
Translated Japanese Office Action Jul. 7, 2008 - provided to show relevance of the following references: JP 49-25387, JP 52-130340, JP 58-108574, JP 58-137880, JP 60-209781, JP 62-250477.

"Display", http://web.archive.org/web/20010717132509/http://whatis.techtarget.com/definition/0,,sid9_gci211965,00.html, Jul. 27, 2000.
Non Final Office Action; Mail Date Feb. 16, 2010; U.S. Appl. No. 12/107,589
Final Office Action; Mail Date Feb. 26, 2010; U.S. Appl. No. 10/476,590.

* cited by examiner

DISPLAY METHOD FOR MULTIPLE LAYERED SCREENS

TECHNICAL FIELD

This invention relates to software visual effects.

BACKGROUND ART

Many software programs these days display information on a screen using effectively a multi-layered approach.

For example, a drawing package may have a central area which the software user can draw upon.

In a typical drawing package there are many drop down menus, tool bars, cursors or templates which effectively overlay the drawing on the screen. The reason for this is that there is only limited screen area available. Thus, for the user to be able to view the functions to be selected, some of the drawing space has to be borrowed for this.

Often, the user is placed in the undesirable position of having to move around the tool bars and menus if possible, or alternatively move the drawing (or whatever file the user is working on) so that the user can actually see parts of the drawing formerly obscured by the menus and so forth.

There is another related problem experienced by software users, particularly in relation to drawing packages, but not exclusively.

Often when compiling a drawing, it is necessary to compile the drawing using several layers of "objects". A typical drawing function gives the user the ability to determine whether the object is viewed as being at the back of the picture or overlaying everything at the front of the picture. This can in some cases lead to the objects at the back of the picture being obscured by larger objects at the front of the picture. Thus, the user cannot readily select the object at the back of the picture with it being obscured.

This is understandably frustrating and can impede the users' ability to work efficiently, often requiring the user to move the front object so as to gain access to the back object.

This frustration is not limited to drawing packages. It can also be frustrating to not having ready access to the multiple levels in such diverse applications as geographical information system (GIS) programs, including medical models, instrumentation using browsers for the internet or game software, for example flight simulators.

All of the aforementioned packages have information on various levels with which the user would desire ready access to.

All references, including any patents or patent applications, cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents forms part of the common general knowledge in the art, in New Zealand or in any other country.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method for creating a visual effect in the display of software in a multilevel screen display formed by pixels wherein the software is for the presentation of data or images on a screen using software functions, the method characterised by the steps of a) assigning a particular screen designation code to some software components, and b) assigning other screen designation codes to other components of the software, and c) determining which other images, data or software components are simultaneously displayed on different screens in the multilevel screen display so that a user of the software can effectively look behind an image displayed on at least one other screen.

In further embodiments of the invention, the software components being assigned a particular screen designation code all relate to images being manipulated. However this should not be seen as limiting. The image being manipulated can mean the manipulation of any image, whether the image is in text format, numbers, graphical or otherwise.

For example, the present invention can be used in relation to software for word processing, drawing, financial and scientific information, flight simulators, internet browsers, spreadsheets, slot machines, instrumentation, medical programs, mapping programs, games and the like.

In some embodiments of the present invention certain software components may be reference data of lesser importance than other data. This, is the data of greater importance may be assigned to the front screen where as data of lesser importance may be placed on background or midground screen. In preferred embodiments if there is an image on the screen which is being manipulated via software functions—even if it is a game scene "being traveled through"—it has a particular screen designation separate to other functions.

It is envisaged that in most cases, the other components of software are standard features which come with the software program. For example, screen template, drop down menus, function keys, cursors, tool bars, head-up displays and the like. However, in some embodiments of the present invention, the different components of the image may be assigned a separate designation code, for example an object which is laid over part of the image.

In some embodiments of the present invention, the method can be applied to existing software, for example Microsoft Word™, Microsoft Powerpoint™, Adobe Photoshop™, MacroMedia Director™ and so forth. However, in other embodiments of the present invention there may be created software which uses the principles behind the present invention.

The screen designation code is merely a code that identifies which physical screen the image or software component is displayed upon.

The inventors of the present invention also invented a multi-level screen display and this is described in detail in PCT Application Nos. PCT/NZ98/00098 and PCT/NZ99/00021.

This is a device which is created by combining multiple layers of selectively transparent screens. Each screen is capable of showing an image. In preferred embodiments, the screen layers are liquid crystal displays. Preferably the screens are aligned parallel to each other with a preset distance between them.

With this invention, images displayed on the screen furthest from the view (background screen), will appear at some depth behind the images displayed on the screen closest to the viewer (foreground screen). The transparent portions on the foreground screen will allow viewers to see images displayed on the background screen.

This arrangement of layering multiple screens allows images to be presented at multiple levels giving the viewer true depth without use of glass or lens.

The present invention shall now refer to use with a multi-level screen as described above although this should not be seen as limiting.

It should be appreciated that although reference shall be made throughout this specification now to only background and foreground screens, other aspects of the present invention may utilise more than two screens. For example, with drawing packages all of the readily useable software functions may be on the foreground while various layers of the drawing may be on the multiple screens behind the foreground screen.

With the present invention, a screen designation code may be used to place all of the standard software functions, templates, tool bars and the like on the foreground screen. However, the image being worked upon may be placed on the background screen. This arrangement allows the user of the software to effectively look behind the foreground components to view the image being manipulated.

This ability may be enhanced if the traditional opaque background to the functions has varying shades of transparency. This feature may be imparted by a version of software in accordance with the present invention.

Thus, there is now no requirement for the user to move around on screen various toolbars and the like so as to get a full view of the image.

Further, if the package is for example, a drawing package, the foreground and background components may actually be on different screens, again allowing the viewer to view and possibly select the drawing components without one obscuring the other.

To allow the drawings components to be readily and/or manipulated, the components themselves may have different transparencies. Further, the traditional white palette may be fully transparent.

There are a number of methods by which the present invention can be implemented.

In some embodiments of the present invention it may be that existing software is coded to identify screen functions which are normally "always on top" or "always at back". If this is the case, one embodiment of the present invention will be an interface that identifies the coding on existing software with these identifiers and assign the various software components eg toolbar to the appropriate foreground or background screen.

The interface maybe a patch for existing software, a display driver, a library file or a new front end for multiple existing software packages or a completely new operating system. Instead of software, graphic cards may be used to divide the images appropriately. This will increase the speed of operation considerably.

Further aspects of the present inventions provide a media which can contain instructions for the operation of method as described.

The background fill of 'always on top' functions can be made fully or partially transparent by the present invention.

With existing software that does not have such coding, it may be necessary to implement the present invention by having customised software in which the software developer specifies the software routines which cause the appropriate components and images to go on the appropriate screens.

Other aspects of the present invention include not just interface programs which enable existing software to be used on multi-level displays, but original software programs which likewise utilise the concept of having a screen for the file or image being worked upon and other screens for more standard software functions, templates and the like.

There is software available which can be used with multiple monitors placed side by side. This software has screen designation codes as such, in that the x-axis coordinate determines on which of the monitors the information is to be displayed. It is envisaged that this software could be used in the present invention with a code which normally would assign an image to a particular monitor will now assign that image or data pixel to one of the screens in a multi-level display.

Other aspects of the present invention includes an operating system which incorporates the principles of the present invention as previously described and also a web browser which also incorporates the principles as previously described.

It can be seen that the present invention adds a new dimension, literally and figuratively to existing software and potential for new software.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
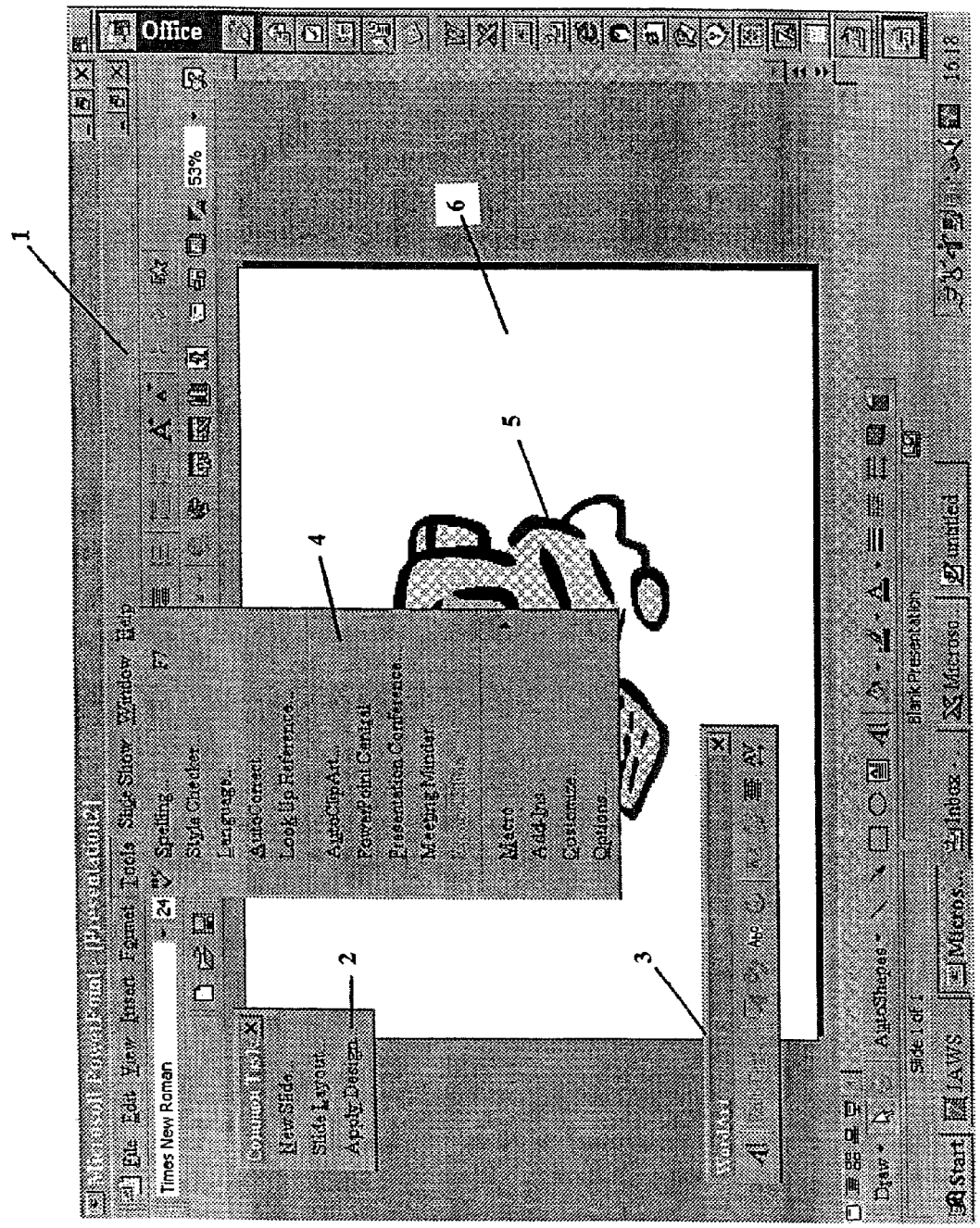
FIG. 1 illustrates a prior art screen display.

With respect to FIG. 1, there is illustrated a typical screen display found in commercial software, in this case, the commercial software is Microsoft Powerpoint™.

On this display there is an external template (1), two toolbars (2, 3), a drop down menu (4) and an image to be manipulated (5) on a palette (6).

It can be seen that the toolbars (2, 3) and drop down menu (4) obscure the image (5) and palette (6).

Figure 2:
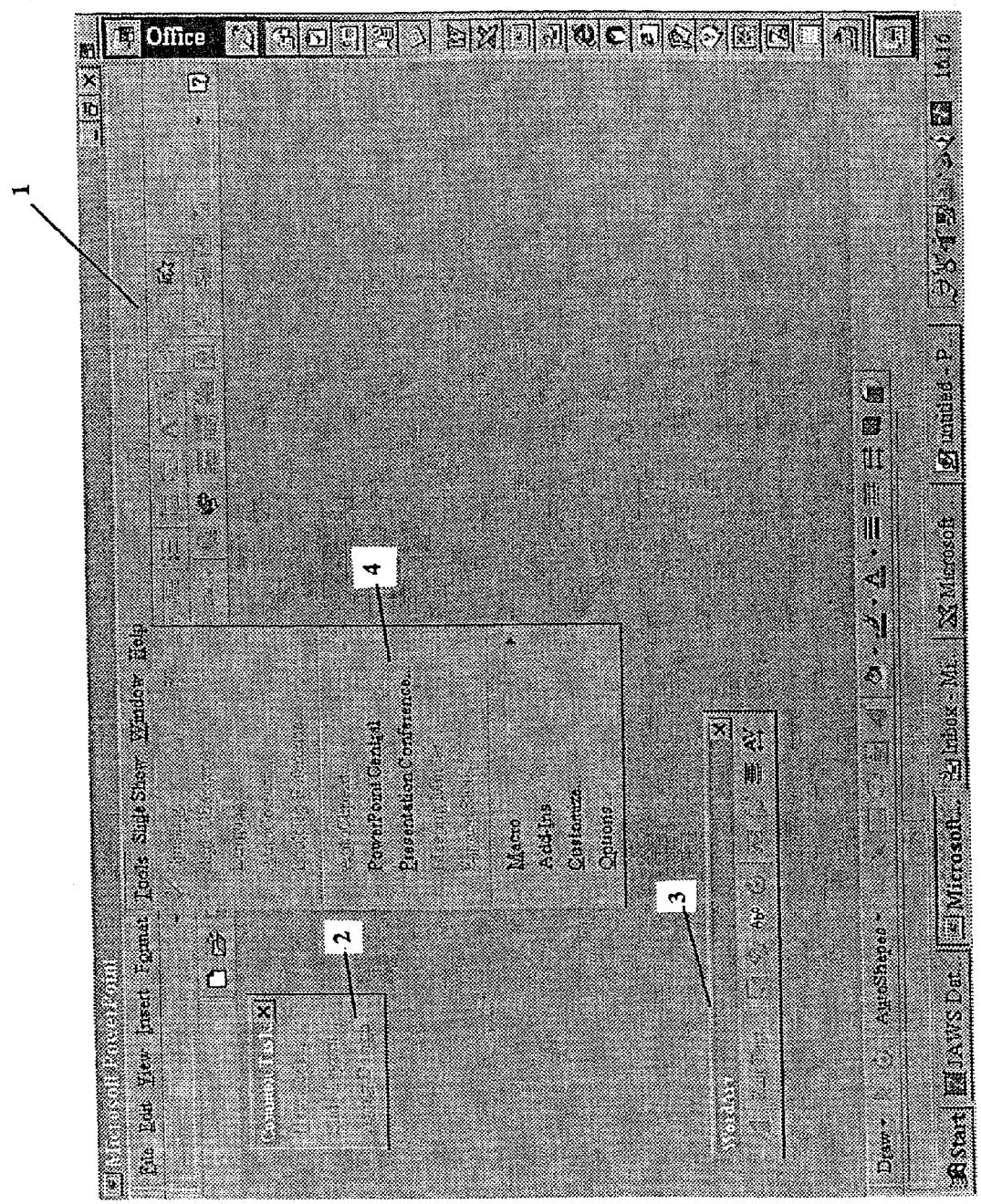
FIG. 2 illustrates a foreground screen display in accordance with one embodiment of the present invention.

With the present invention, the common components of the software can be placed on the foreground screen of a multi-level screen display as illustrated in FIG. 2. It should be noted that the palette (6) and the image (5) are not displayed on the foreground screen.

Figure 3:
FIG. 3 illustrates a background screen display in accordance with one embodiment of the present invention.

Instead, the image (5) is displayed on a background screen as illustrated in FIG. 3. With the present invention there is no need to display a palette.

The separation of the image (5) from the standard software components (1, 2, 3 and 4) is achieved by the present invention assigning screen designation codes to each of these which determine whether they are placed on the foreground or background screen. Again, it should be appreciated that there may be more than two screens and these components can be placed on any of these.

Not illustrated is the effect of having the foreground screen over the background screen as this is a 3-dimensional effect difficult to show. However, as the foreground screen is a physical distance from the background screen and transparent in places to respect to the background screen, it is possible for the user to look around and behind the tool bars and drop down menu to view the image on the background screen.

Aspects of the present invention have been described by way of example only and it should be appreciated that modifications and additions may be made thereto without departing from the scope of the appended claims.

The invention claimed is:

1. A method of displaying images using a multi-component display, said method comprising:
   accessing data operable to display a first image and a second image;
   assigning a first screen designation code to said first image;
   assigning a second screen designation code to said second image;
   displaying said first image on a first display screen of said multi-component display, wherein said displaying said first image further comprises displaying said first image using a first plurality of pixels of said first display screen, and wherein said displaying said first image further comprises displaying said first image in accordance with said first screen designation code; and
   displaying said second image on a second display screen of said multi-component display, wherein said first and second display screens overlap, wherein said displaying said second image further comprises displaying said second image using a second plurality of pixels of said second display screen, and wherein said displaying said second image further comprises displaying said second image in accordance with said second screen designation code.

2. The method of claim 1, wherein said displaying said first image and said displaying said second image are performed contemporaneously.

3. The method of claim 1, wherein said first image and said second image overlap.

4. The method of claim 1, wherein said first image is associated with a foreground and said second image is associated with a background.

5. The method of claim 1, wherein said assigning said first screen designation code further comprises assigning said first screen designation code based upon a screen function of said first image.

6. The method of claim 5, wherein said screen function is selected from a group consisting of an always-on-top identifier and an always-at-back identifier.

7. The method of claim 1 further comprising:
   determining, from said data, a depth relationship of said first image with respect to said second image; and
   wherein said assigning said first screen designation code further comprises assigning said first screen designation code based upon said depth relationship; and
   wherein said assigning said second screen designation code further comprises assigning said second screen designation code based upon said depth relationship.

8. The method of claim 1, wherein said first image is configured for manipulation by a user, and wherein said second image is a component associated with said first image.

9. The method of claim 8, wherein said component is selected from a group consisting of a software function, a template, a drop down menu, a function key, a cursor, a tool bar and a heads-up display.

10. The method of claim 1, wherein said displaying said first image further comprises displaying said first image with partial transparency to enable viewing of said second image through said first image.

11. The method of claim 1, wherein said first and second display screens each comprise a respective liquid crystal display (LCD).

12. The method of claim 1, wherein said assigning said first and second screen designation codes and said displaying said first and second images are performed by a display driver.

13. The method of claim 1, wherein said first and second images are associated with an application configured for execution by a computer system coupled to multiple display devices.

14. The method of claim 1, wherein said first and second images are associated with an operating system.

15. The method of claim 1, wherein said first and second images are associated with a web browser.

16. The method of claim 1, wherein said first and second images are associated with an application selected from a group consisting of a spreadsheet application, a word-processing application, a database application, and a presentation application.

17. The method of claim 1, wherein said first and second images are associated with an application selected from a group consisting of a graphical application and a drawing application.

18. The method of claim 1, wherein said first and second images are associated with an application selected from a group consisting of an instrumentation application, a medical application, a financial application, and a scientific application.

19. The method of claim 1, wherein said first and second images are associated with a geographical information system.

20. The method of claim 1, wherein said first and second images are associated with a gaming application.

21. The method of claim 1, wherein said first and second images are associated with content selected from a group consisting of a video and a still image.

22. A computer-usable medium having computer-readable program code embodied therein for causing a computer system to perform a method of displaying images using a multi-component display, said method comprising:
   accessing data operable to display a first image and a second image;
   assigning a first screen designation code to said first image;
   assigning a second screen designation code to said second image;
   displaying said first image on a first display screen of said multi-component display, wherein said displaying said first image further comprises displaying said first image using a first plurality of pixels of said first display screen, and wherein said displaying said first image further comprises displaying said first image in accordance with said first screen designation code; and
   displaying said second image on a second display screen of said multi-component display, wherein said first and second display screens overlap, wherein said displaying said second image further comprises displaying said second image using a second plurality of pixels of said second display screen, and wherein said displaying said second image further comprises displaying said second image in accordance with said second screen designation code.

23. The computer-usable medium of claim 22, wherein said displaying said first image and said displaying said second image are performed contemporaneously.

24. The computer-usable medium of claim 22, wherein said first image and said second image overlap.

25. The computer-usable medium of claim 22, wherein said first image is associated with a foreground and said second image is associated with a background.

26. The computer-usable medium of claim 22, wherein said assigning said first screen designation code further comprises assigning said first screen designation code based upon a screen function of said first image.

27. The computer-usable medium of claim 26, wherein said screen function is selected from a group consisting of an always-on-top identifier and an always-at-back identifier.

28. The computer-usable medium of claim 22, wherein said method further comprises:
    determining, from said data, a depth relationship of said first image with respect to said second image; and
    wherein said assigning said first screen designation code further comprises assigning said first screen designation code based upon said depth relationship; and
    wherein said assigning said second screen designation code further comprises assigning said second screen designation code based upon said depth relationship.

29. The computer-usable medium of claim 22, wherein said first image is configured for manipulation by a user, and wherein said second image is a component associated with said first image.

30. The computer-usable medium of claim 29, wherein said component is selected from a group consisting of a software function, a template, a drop down menu, a function key, a cursor, a tool bar and a heads-up display.

31. The computer-usable medium of claim 22, wherein said displaying said first image further comprises displaying said first image with partial transparency to enable viewing of said second image through said first image.

32. The computer-usable medium of claim 22, wherein said first and second display screens each comprise a respective liquid crystal display (LCD).

33. The computer-usable medium of claim 22, wherein said assigning said first and second screen designation codes and said displaying said first and second images are performed by a display driver.

34. The computer-usable medium of claim 22, wherein said first and second images are associated with an application configured for execution by a computer system coupled to multiple display devices.

35. The computer-usable medium of claim 22, wherein said first and second images are associated with an operating system.

36. The computer-usable medium of claim 22, wherein said first and second images are associated with a web browser.

37. The computer-usable medium of claim 22, wherein said first and second images are associated with an application selected from a group consisting of a spreadsheet application, a word-processing application, a database application, and a presentation application.

38. The computer-usable medium of claim 22, wherein said first and second images are associated with an application selected from a group consisting of a graphical application and a drawing application.

39. The computer-usable medium of claim 22, wherein said first and second images are associated with an application selected from a group consisting of an instrumentation application, a medical application, a financial application, and a scientific application.

40. The computer-usable medium of claim 22, wherein said first and second images are associated with a geographical information system.

41. The computer-usable medium of claim 22, wherein said first and second images are associated with a gaming application.

42. The computer-usable medium of claim 22, wherein said first and second images are associated with content selected from a group consisting of a video and a still image.

43. A system comprising a processor and a memory, wherein said memory includes instructions that when executed by said processor implement a method of displaying images using a multi-component display, said method comprising:
    accessing data operable to display a first image and a second image;
    assigning a first screen designation code to said first image;
    assigning a second screen designation code to said second image;
    displaying said first image on a first display screen of said multi-component display, wherein said displaying said first image further comprises displaying said first image using a first plurality of pixels of said first display screen, and wherein said displaying said first image further comprises displaying said first image in accordance with said first screen designation code; and
    displaying said second image on a second display screen of said multi-component display, wherein said first and second display screens overlap, wherein said displaying said second image further comprises displaying said second image using a second plurality of pixels of said second display screen, and wherein said displaying said second image further comprises displaying said second image in accordance with said second screen designation code.

44. The system of claim 43, wherein said displaying said first image and said displaying said second image are performed contemporaneously.

45. The system of claim 43, wherein said first image and said second image overlap.

46. The system of claim 43, wherein said first image is associated with a foreground and said second image is associated with a background.

47. The system of claim 43, wherein said assigning said first screen designation code further comprises assigning said first screen designation code based upon a screen function of said first image.

48. The system of claim 47, wherein said screen function is selected from a group consisting of an always-on-top identifier and an always-at-back identifier.

49. The system of claim 43, wherein said method further comprises:
    determining, from said data, a depth relationship of said first image with respect to said second image; and
    wherein said assigning said first screen designation code further comprises assigning said first screen designation code based upon said depth relationship; and
    wherein said assigning said second screen designation code further comprises assigning said second screen designation code based upon said depth relationship.

50. The system of claim 43, wherein said first image is configured for manipulation by a user, and wherein said second image is a component associated with said first image.

51. The system of claim 50, wherein said component is selected from a group consisting of a software function, a template, a drop down menu, a function key, a cursor, a tool bar and a heads-up display.

52. The system of claim 43, wherein said displaying said first image further comprises displaying said first image with partial transparency to enable viewing of said second image through said first image.

53. The system of claim 43, wherein said first and second display screens each comprise a respective liquid crystal display (LCD).

54. The system of claim 43, wherein said assigning said first and second screen designation codes and said displaying said first and second images are performed by a display driver.

55. The system of claim 43, wherein said first and second images are associated with an application configured for execution by a computer system coupled to multiple display devices.

56. The system of claim 43, wherein said first and second images are associated with an operating system.

57. The system of claim 43, wherein said first and second images are associated with a web browser.

58. The system of claim 43, wherein said first and second images are associated with an application selected from a group consisting of a spreadsheet application, a word-processing application, a database application, and a presentation application.

59. The system of claim 43, wherein said first and second images are associated with an application selected from a group consisting of a graphical application and a drawing application.

60. The system of claim 43, wherein said first and second images are associated with an application selected from a group consisting of an instrumentation application, a medical application, a financial application, and a scientific application.

61. The system of claim 43, wherein said first and second images are associated with a geographical information system.

62. The system of claim 43, wherein said first and second images are associated with a gaming application.

63. The system of claim 43, wherein said first and second images are associated with content selected from a group consisting of a video and a still image.

* * * * *